Patented Nov. 21, 1922.

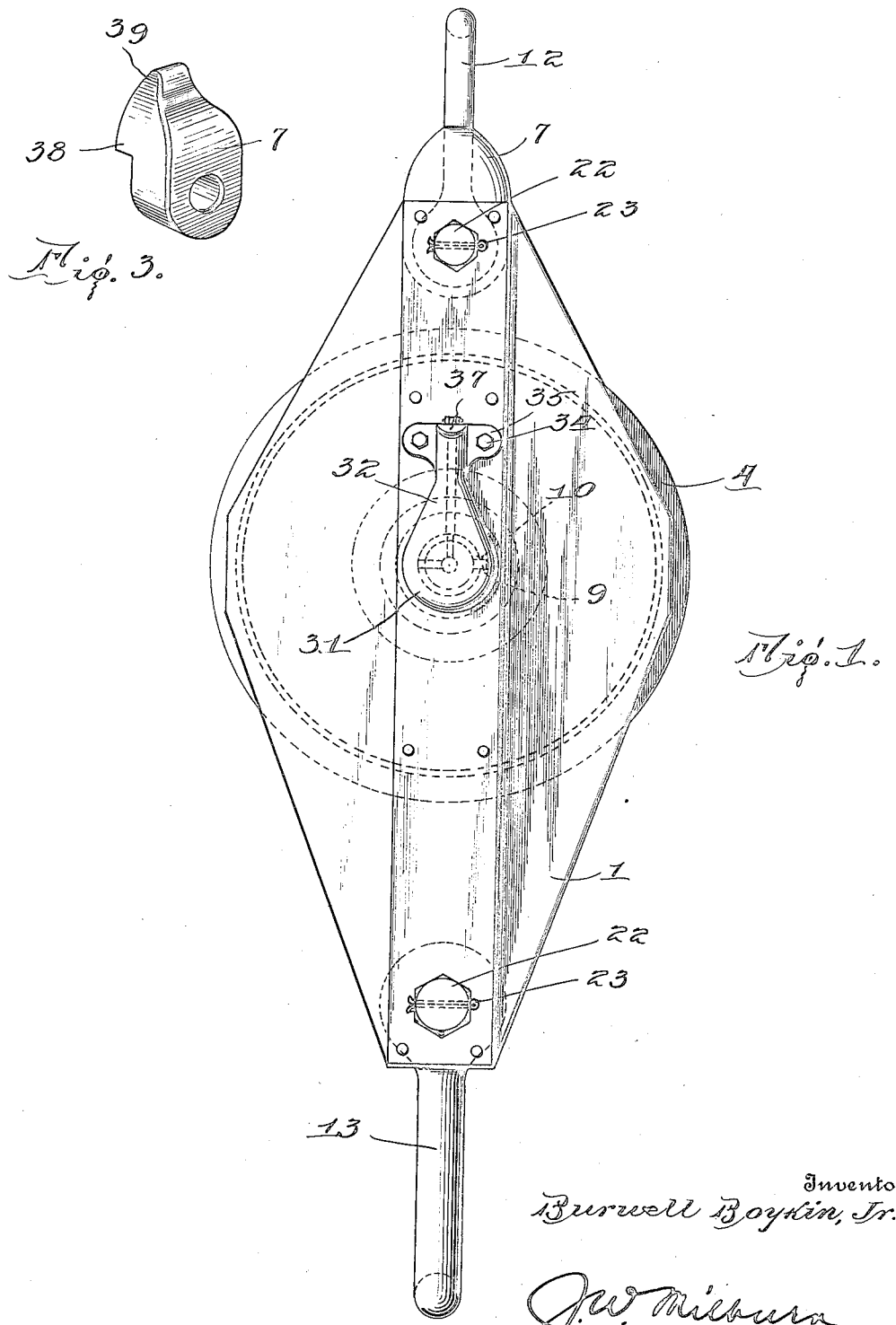

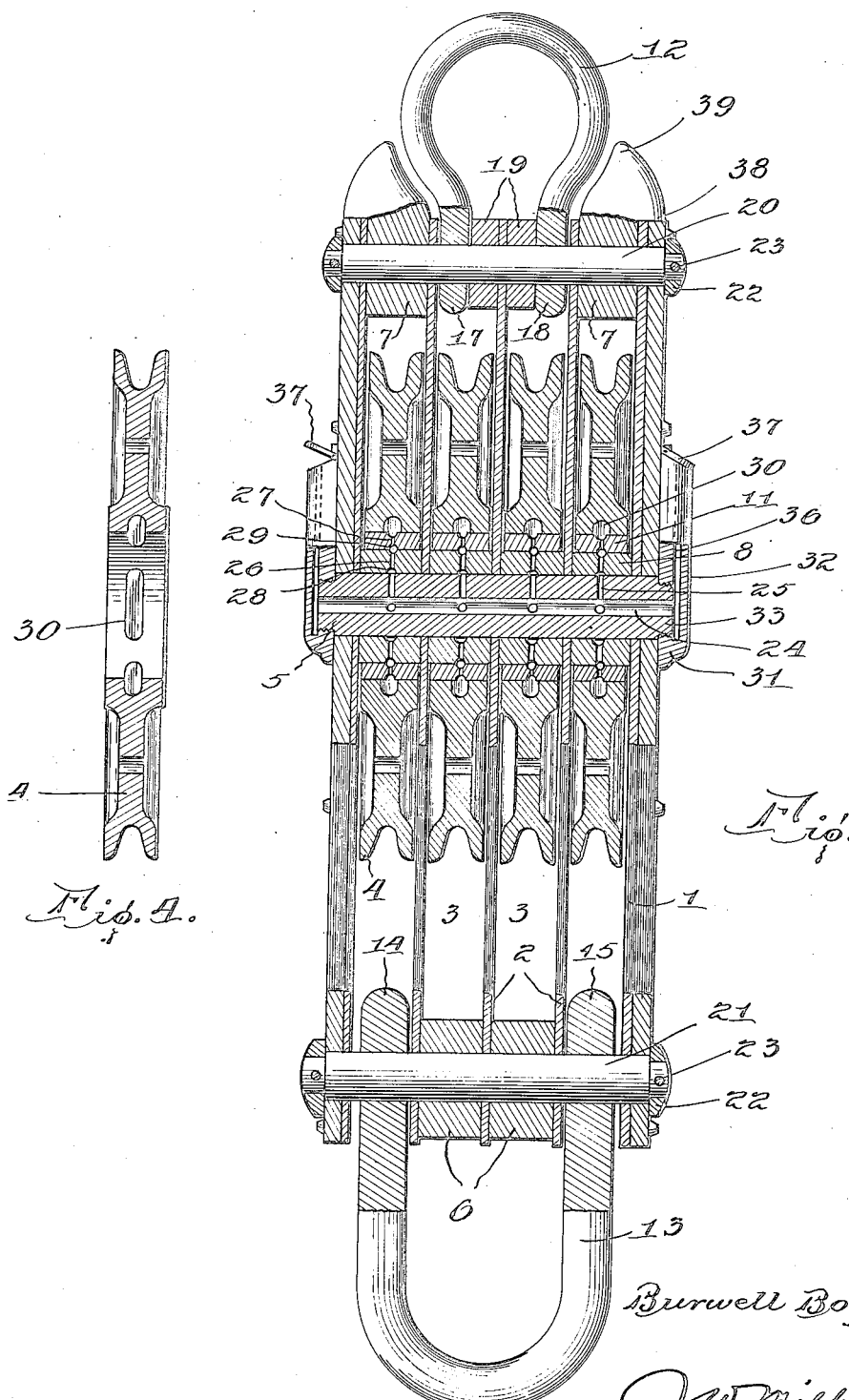

1,435,953

UNITED STATES PATENT OFFICE.

BURWELL BOYKIN, JR., OF BEAUMONT, TEXAS.

PULLEY BLOCK.

Application filed January 21, 1922. Serial No. 530,887.

*To all whom it may concern:*

Be it known that I, BURWELL BOYKIN, Jr., a citizen of the United States, residing at Beaumont, in the county of Jefferson and State of Texas, have invented certain new and useful Improvements in Pulley Blocks, of which the following is a specification.

My invention relates to pulley blocks and particularly to blocks adapted to be used in connection with well-drilling apparatus.

Among the objects of my invention are the provision of an improved bearing construction for the sheave or sheaves; lubrication of the sheave bearing or bearings through the center pin, and protection of the upper edges of the block to prevent the block from catching on parts of the derrick, or elsewhere, while being elevated.

In the accompanying drawings,

Fig. 1 is a side elevational view of a block embodying my improvements;

Fig. 2 is a central transverse vertical sectional view of a multiple sheave block embodying said improvements;

Fig. 3 is a perspective view of one of the combined spacer and protector members; and, Fig. 4 is a central vertical sectional view of one of the sheaves.

My invention is applicable to both single-sheave and multiple sheave blocks. In its preferred form shown in Fig. 2, the block consists of a frame composed of spaced side members 1 and parallel partition members 2, forming chambers 3 for the reception of sheaves 4, rotatably mounted on a common center pin 5, which thus acts as a journal for the sheaves. The center pin also serves as a strengthening bolt for the frame and a means for supplying a lubricant to the sheave bearings.

The members 1 and 2 are held in spaced relation by central spacer rings 6 at the lower end, combined spacer and protector members 7 in the upper end of the outer chambers 3, and bearing rings 8 of steel or other relatively hard metal keyed on the center pin by means of a feather 9 on the pin and a groove 10 on each of the bearing rings.

The sheaves are provided with bushings 11, of relatively soft metal, such as brass or copper, mounted to rotate with the sheaves upon the stationary bearing rings 8 fixed to the center pin.

A suspension device 13 is provided at the lower end of the block, which, as illustrated, is in the form of a bail with its arms 14, 15, set in the ends of spaced sheave chambers 3. A similar suspension device 12 for the block is shown at the top of the block, with its arms 17, 18, set in the tops of sheave chambers 3. Suitable spacing washers 19 may be employed with either or both of the bails. The type of suspension device shown is illustrative merely; other forms may be substituted according to the needs of the specific purpose for which the block is to be used.

The block is so constructed as to be collapsible, the various parts being separable and provided with suitable apertures to receive the means for retaining the parts in assembled relation. This retaining means consists of the removable center pin 5, upon which the sheaves are mounted, and removable upper and lower pins or bolts 20 and 21, passed through the apertured side members 1 and partitions 2, and through the arms of the suspension devices and the spacer members.

The upper and lower pins 20 and 21 are provided with heads 22, detachably secured by cotter pins 23 or other convenient removable fastening means. The center pin is held by screw caps of particular construction which form a part of the lubricating means for the sheave bearings.

The lubrication of the sheave bearings is effected by oil or other lubricating fluid inserted through passages in the center pin and the screw caps by which it is held. For this purpose, the center pin 5 is provided with a longitudinal bore 24 and spaced series of radial passages 25, from the bore to the exterior of the pin at intervals throughout its length, there being preferably one or more of such radial passages, or one or more of such series of radial passages for each sheave. Similar passages 26 and 27 are provided in the bearing rings 8 and bushings 11, respectively. These passages may be of uniform diameter, but the passages 27 are preferably of smaller bore than passages 26, and the latter of less diameter than passages 25, this arrangement tending to effect a more satisfactory distribution of the lubricating fluid. Annular grooves in the opposite faces of the bearing rings and enlargements of the passages, bushings form which act as pockets or reservoirs 28, for the lubricant on the line of the contacting faces of the center pin 5 and bearing rings 8, and similar pockets 29, between the contacting faces of the bearing rings 8 and bushings 11. One or more oil pockets 30 may also be formed in the sheave, in connection with the radial lubricating passages.

Oil is supplied to the center pin through the screw caps 31, each cap having a radial extension 32, adapted to assume a vertical position when the cap is screwed up tight on the screw-threaded end 33 of the center pin, and to be removably secured to the frame in such position by screws or like fastening means 34 through apertures in ears 35, provided on extension 32 for this purpose. The extension 32 has a passage 36 through it communicating with the bore of the center pin and closed at its upper end by a hinged cap or cover 37. Passage 36 serves as a lubricant cup from which the lubricant flows through the radial passages of the bushings into the annular grooves and pockets. By this means a simple and convenient gravity feed device is provided which insures the lubrication of each sheave wheel.

During the use of a pulley block in well-drilling operations, difficulty has been experienced through the catching of the upper edges of the block upon the sides of the derrick or upon the foot-board, while the block is being elevated. To avoid this difficulty, I provide guards for the upper edges of the block which consist of protector members projecting beyond the top of the frame. In its preferred embodiment, the protector member is in the form of an integral extension of one of the upper spacer rings 7. The member 7 is extended outwardly into an ear 38 projecting over the top of the side plate 1, and upwardly into a nose 39, the outer face of the member 7 between these parts being rounded or beveled to form an uninterrupted curve from the outside top edge of the side plate 1 to the top of the member 7. This rounded surface forms a buffer or guard for the top edge of the block and acts to throw the block off from any obstacle with which the guard comes into contact and upon which the top of the frame, if unprotected, would catch.

What I claim is:

1. A block of the character described comprising a frame, a sheave mounted therein, a suspension means carried by the upper part of the frame, a spacing member attached to the frame at each side of the suspension means and projecting upwardly adjacent thereto, said upwardly projecting members having their upper faces rounded and adapted to protect the outer edges of the frame.

2. A block of the character described comprising a frame having spaced side members, a suspension device, spacing blocks between the suspension device and the side members at the upper portion of the frame, each of said spacing blocks comprising a lower washer portion and an upper projection therefrom extending beyond the top of the frame and overlying the edge thereof to protect the upper edge of said frame.

3. A block of the character described comprising a frame having spaced side members, a sheave mounted therein, a suspension means carried by the upper part of the frame between said side members, a spacing member confined between said suspension means and an adjacent frame member, said spacing member having an upwardly extending portion overlying and protecting the upper edge of the block.

4. A block of the character described comprising a frame having spaced side members, means for connecting the upper portions of said side members, a suspension means carried by said connecting means, and a spacing member also carried by said connecting means between said suspension means and a side frame member, said spacing member having an upwardly extending portion overlying and protecting the upper edge of the block.

5. A block of the character described comprising a plurality of spaced parallel frame members, a pin extending through the central portion of said members, sheaves mounted on said pin, a pin extending through the upper portion of the frame members, a suspension means on said upper pin, and a spacing member on said upper pin confined between said frame members, said spacing member having an upwardly extending portion overlying and protecting the upper edge of the block.

6. A block of the character described comprising a plurality of spaced parallel frame members, a pin extending through the central portion of said members, sheaves mounted on said pin, a pin extending through the upper portion of the frame members, a suspension means on said upper pin, and a pair of spacing members on said upper pin confined between said frame members, each of said spacing members projecting upwardly adjacent to the suspension means and overlying the upper edge of the block, the outer face of the projecting portion of said spacing member being curved, whereby a beveled guard or protector is provided for the edge of the block.

In testimony whereof I affix my signature.

BURWELL BOYKIN, Jr.